Oct. 1, 1963  J. G. BIRRELL  3,105,318
FLOAT WITH RENEWABLE SELECTIVELY USABLE SPREADER
Filed Aug. 8, 1961
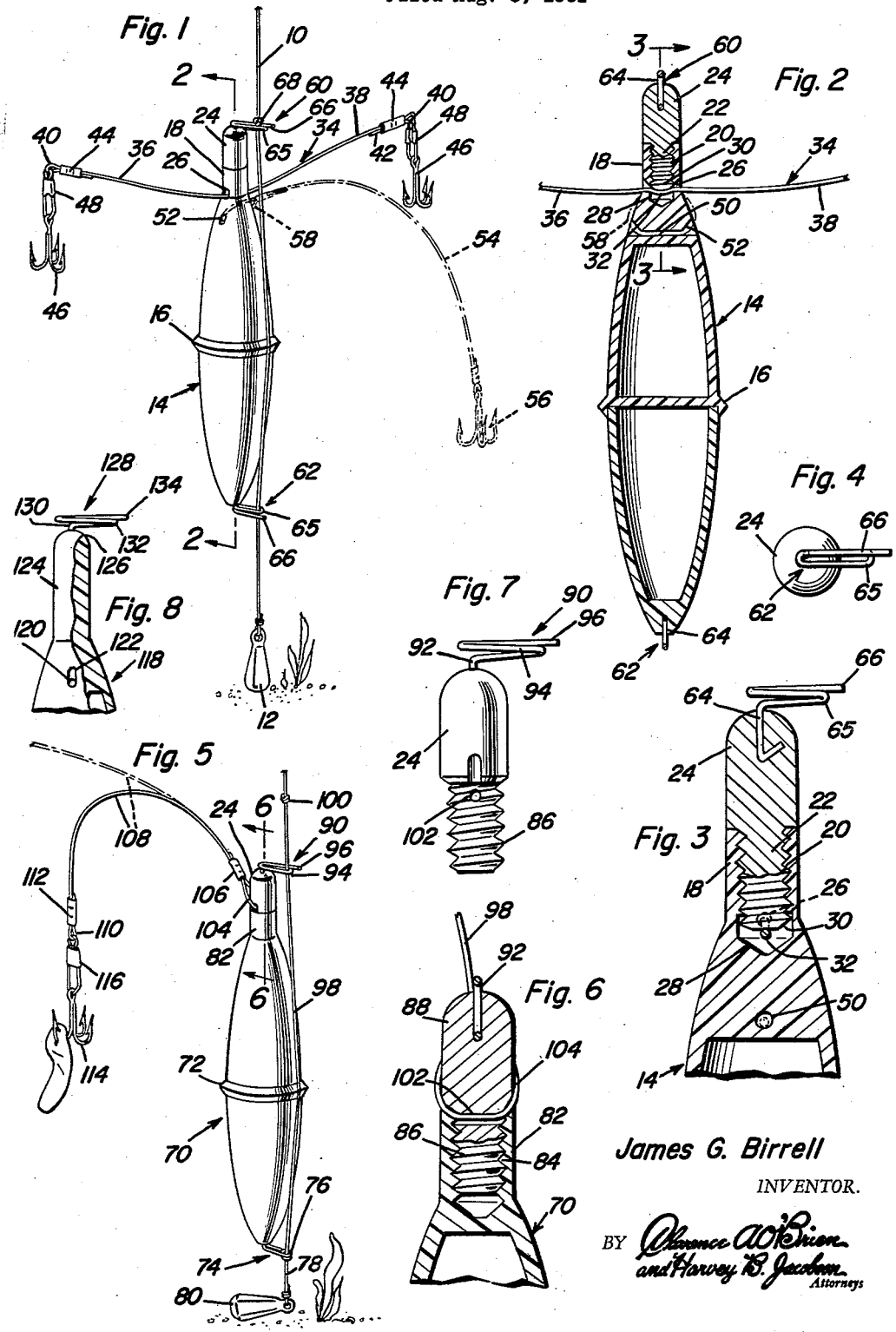
James G. Birrell
INVENTOR.

United States Patent Office 3,105,318
Patented Oct. 1, 1963

3,105,318
FLOAT WITH RENEWABLE SELECTIVELY
USABLE SPREADER
James G. Birrell, 6319 Corpus Christi St., Houston, Tex.
Filed Aug. 8, 1961, Ser. No. 130,187
3 Claims. (Cl. 43—43.15)

The present invention relates, broadly construed, to fishing tackle but, more particularly, to a sinker-equipped fishing line, a float provided with improved means for mounting said float on the fishing line, and hook-equipped spreaders which are mounted on an intended end portion of the float.

By way of introduction it is to be pointed out that the subject matter of the instant proceeding is similar in certain respects to a fishing float covered in Patent No. 2,975,541, granted to me on March 21, 1961, and which has to do with a float similar to the one herein revealed and having certain convertible characteristics, including a fishhook suspension spreader and a sinker.

A general objective in the invention, as will be hereinafter more explicity revealed, is to structurally, functionally and in other ways improve upon the above-mentioned patent and any similar prior art adaptations.

One aspect of the concept, regarded as novel, compared with the above-stated patent, has to do with a float one end portion of which is so constructed that it may be utilized in conjunction with novel selectively usable spreaders, to accommodate a pair of diametrically opposite fishhooks or, alternatively, a single fishhook located at one side only of the float, depending on the particular spreader which is being used.

The concept also comprehends fishing tackle characterized by an ordinary fishing line, a sinker (of suitable mass or weight) attached to the free lower end of the line, and a float which is adapted to be located alongside of a selected portion of the line and which has novel means at its upper and lower ends respectively through the medium of which said upper and lower ends may be attached to and adjusted longitudinally on the line relative to the line and also to the sinker at the bottom line, and to in this manner predetermine and in fact regulate the distance between the float and the sinker.

The invention also features novel float attaching and adjusting clips wherein said clips are such as to adjustingly and also detachably mount the float on the weighted line.

Novelty is also predicated on the upper end construction of the float in that it facilitates detachably mounting renewable nylon or equivalent spreaders on said upper end. One spreader has a median portion attached to the float with end portions projecting well beyond the float and carrying fishhooks. The other selectively employable spreader, which may be referred to as a single-type spreader, has one end looped around and attached to the float with the other end free and carrying a fishhook.

Reverting to prior Patent 2,975,541 and somewhat secondarily to prior Patent 2,877,594, it is to be pointed out that whereas in these prior adaptations the sinker is secured to the lower end of the float in use, the sinker in the instant presentation is "tied" to the lower end of the fishline and inasmuch as the float is free to slide on the line if the sinker snags on a rock or the like and the fishline (which has an established breaking point) should break, the float ascends to the surface and is retrievable. In addition, the fisherman is permitted to fish at any depth from the bottom by merely providing a check knot on the fishline. Then, too, the instant construction is such that the fishline can be positively secured to the float by wrapping a portion of the line several times around an available shank of a line attaching clip carried by the float.

The present invention also pertains to a float the upper end of which is constructed to facilitate attachment of the nylon or equivalent leader (either single or double) in several different ways to expedite renewal whenever necessary or desired.

Numerous other objects, features and advantages of the invention will become readily apparent from the following description and the accompanying illustrative, but not restrictive, drawing and the accompanying description of the same.

In the drawings, wherein like numerals are employed to designate like parts throughout the views:

FIGURE 1 is a view in perspective of improved fishing tackle constructed in accordance with the invention and showing the same in readiness for use and illustrating, in phantom lines, one of the single-type spreaders;

FIGURE 2 is a view with portions omitted and taken on the central vertical line 2—2 of FIGURE 1;

FIGURE 3 is an enlarged view in section and elevation on the vertical line 3—3 of FIGURE 2;

FIGURE 4 is a top plan view of the clip-equipped upper end;

FIGURE 5 is a view in perspective of a modified form of the invention;

FIGURE 6 is a detail view on a slightly enlarged scale on the line 6—6 of FIGURE 5;

FIGURE 7 is a view in elevation of the applicable and detachable cap or head of the type employed in FIGURES 5 and 6; and FIGURE 8 is a view in section and elevation of the upper end portion showing a slight modification in the construction.

Reference being had first to FIGURES 1 to 4, inclusive, and particularly to FIGURE 1 the numeral 10 designates a fishing line which in the combination shown is provided at its bottom with a sinker 12 of prerequisite weight, the sinker being removably tied to the line. The vertically elongated hollow or equivalent float is denoted by the numeral 14 and is provided intermediate its ends with an outstanding so-called popping rib 16. The reduced neck 18 on the upper end of the float is provided as illustrated in FIGURE 2 with an axial screw-threaded socket 20 which opens through the upper end of the neck, said socket adapted to accommodate a coacting threaded portion on the screw-threaded shank 22 carried axially and depending from the detachable head or cap 24. Also as shown in FIGURE 2 there is a passage 26 which extends through the reduced neck and at the center of this a pocket-like recess 28 is provided, the same communicating with the passage 26. The length of the shank or screw is such that the lower end 30 descends slightly into the recess or pocket 28 in a manner to bend and put the median portion of the spreader 32 under tension. The spreader is denoted as an entity by the numeral 34 and it is preferably constructed of a suitable length of flexibly resilient nylon the projecting end portions being denoted at 36 and 38 in FIGURE 1. The outer free ends are bent back upon themselves to define eyes 40, the free end of each eye being denoted at 42 and held in place by a brass or an equivalent ferrule or sleeve 44. In actual practice the end portion 42 which forms the eye 40 is of a prescribed test strength so that it is operable when an abnormal strain or pull is exerted on the fishhook 46 and the fishhook fastener 48 which is attached to the pull released eye 40. It follows that if one hook 46 should get caught on a snag or an equivalent stationary object the end portion 40 would either break or the eye would open up to free the float and thus minimize the likelihood of losing the same. In practice with this form of the invention one end of the nylon spreader is threaded through the opening 26, the latter being sufficiently large to permit this threading step to be accomplished. The two end portions 36 and 38 are balanced to assume the equalized position depicted in FIGURE 1. Then by inserting the screw-threaded shank 22 and screwing it down and bending the portion 32 of the leader into the pocket 28 the leader is put under tension and is also securely clamped in its desired functioning position.

It may be mentioned that the fishing line must be of a relative strength or pull resisting power proportional with the strength of the breakaway eye 40 that should both the fishhook and sinker get simultaneously caught, that is snagged, the breakaway eye would function first and then the fishline would come into play so that the fishline would ultimately break and it would be possible to retrieve the float.

It will also be noted that the upper part of the body just below the neck is provided with another through passage 50 having enlarged end portions 52 and this construction provides means for attaching a single hook spreader. More specifically this spreader comprises a suitable length of nylon of requisite gauge similar to the one shown in full lines in FIGURE 5. In FIGURE 1 the spreader or leader is denoted at 54 the outer free end being provided with a suitably attached fishhook 56. The inner attachable end is provided with a loop 58 the bight portion of which is passed through the passage 50 and anchored in place as shown in dotted lines in FIGURE 2. This single hook single spreader will be referred to again in connection with the modification shown in FIGURE 5.

Still continuing with the description in FIGURES 1 to 4 inclusive it will be noted that the upper and lower end portions of the float are slidingly and grippingly fastened on the fishing line by attaching and retaining clips the upper one being denoted at 60 and the lower one at 62. Both clips are the same in construction and a description of one will suffice for both. With reference to FIGURE 4 in particular a length of proper-strength wire is bent upon itself to provide an elongated loop or eye 62. One end, that is the shank 64 (FIG. 2) is fastened axially to the cap or head 24. The free end is fashioned into a resilient finger 66 which is used to readily pilot or feed the portion of the line into the eye to provide a sliding connection. It is also possible to simply clip the line frictionally between the finger 66 and the adjacent side portion of the eye 62. Thus the connection may be easily made and when the line is passed slidingly through both upper and lower eyes the float is freely adjustable on the line and the upward climb or movement thereof is checked by the knot 68 which is formed in the line. It follows that the float is adjustable on the line between the sinker and the knot and when the cast has been completed and the sinker descends to the bottom as shown in FIGURE 1 the float moves up and is checked by the knot to assume the position there illustrated and to also position the fishhook-equipped spreader means in the manner illustrated whether the means be single-hook type 54 or the double hook type 34.

With the construction and arrangement of the clips used as in FIGURE 1 the float can be readily clipped on the line and also readily removed without breaking the line.

The embodiment of the invention illustrated in FIGURES 5, 6 and 7 is primarily for the single hook leader arrangement. Here the float 70 is the same and provided with a popping rib 72 and has a wire or equivalent line-attaching clip 74 at the bottom or lower end which clip in this instance is formed with aligned coils providing an eye 76 through which the line 78 is threaded. Here the line has been first threaded through the eye for attachment of the sinker 80. The reduced neck 82 has a screw-threaded socket 84 therein to accommodate the screw-threaded shank 86 and head or cap 88 which is provided at its center with a wire clip 90 with a shank 92, eye 94 and piloting or guide fingers 96 as already described. Here again the fishline 98 extends along the side of the float and has a check knot 100 therein to limit the upward sliding of the float. The shank 86 has a hole or passage 102 (FIGS. 6 and 7) to accommodate the bight portion of the nylon loop 104 the free end of said loop being held by the brass or equivalent sleeve 106. This spreader 108 has a breakaway eye 110 held by a sleeve 112 to accommodate the fishhook 114 and connector 116. When the hook is baited it flexes and bends the spreader down whereupon it assumes the full line position shown in FIGURE 5. When the bait is not in position the inherent resiliency lifts the spreader to the dotted line position shown. When it is desired to lock the line it is simply wrapped several times around the shank 92 (not shown).

Considering FIGURES 5, 6 and 7 singly and collectively the construction, arrangement and features and advantages should be clear.

In FIGURE 8 a one-piece neck is provided. Here the float is denoted at 118 and the body portion is the same as already described and the passage 120 with enlarged ends 122 corresponds to the aforementioned passage 50 with enlarged end portions 52 as shown in FIGURE 2. The difference in construction is that the entire neck 124 is of one-piece construction and on the convex crown 126 the float attaching resilient wire, a double-purpose friction gripping clip 128, is provided. Here the shank is denoted at 130, the eye at 132 and the piloting finger at 134.

It will be obvious that in order to lock the float on the fishline all that is necessary is to wrap the line several times around the stem of the eye or clip and then pull the fishline up through the eye. Either eye can be used on both floats to accommodate a snap-on sinker or weight if the occasion requires such use.

If the sinker is attached directly to one or the other of the eyes (not illustrated) the fisherman can place the bait directly on the bottom of the water. Another advantage in the floats illustrated is the fact that the weight of the bait will pull the leader down against the side of the float when casting and keep the hooks from getting tangled in the fishline. After the float has settled in the water the return or spring action of the leader and the buoyancy of the float will put the float in the desired fishing position.

It is believed that a careful consideration of the description in connection with the views of the drawing will enable the reader to obtain a clear and comprehensive understanding of the invention. Therefore a more lengthy description is believed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A float comprising: an elongated, buoyant body provided at an upper end with an upstanding axially projecting neck of a cross-section appreciably less than the cross-section of the upper end of said body portion, said neck having a screw-threaded socket therein opening through the upper end of the neck, a head corresponding in cross-section to said neck and having an axial screw-threaded shank at its bottom screwed into said socket, clips mounted on the upper and lower portions of said body for positioning and shiftably mounting said float on and alongside of the fishing line with which it is adapted to be used, said clips being disposed at right angles to the lengthwise dimension of said body and directly one above the other and having their respective inner ends fixedly mounted on the aforementioned upper and lower portions of said body, at least one of said clips comprising a single length of wire bent upon itself between its ends and forming a narrow elongated eye, one end of said wire being free and projecting outwardly and beyond the adjacent outer end of the eye and providing a line piloting finger, said finger cooperating with said eye in a manner which facilitates guiding and locating the line within the confines of said eye and subsequently facilitates removing the line from said eye, said finger being resilient and being located in close proximity to an adjacent lengthwise side portion of the eye to provide line gripping and retaining means, said neck being provided with opening means passing through at right angles to and communicating with said socket, said opening means being spaced above the bottom of said socket, fishhooks, and support and spreader means therefor embodying a leader of flexibly resilient material and of a cross-sectional gauge less than the cross-sectional dimension of said opening means, said leader having a bendable median portion thereof passing through the opening means, spanning the socket and being spaced from the bottom of said socket and engaged by an adjacent end of the screw-threaded shank, that portion of the leader engaged by said shank being forcibly bent toward the bottom of said socket, disaligned in respect to the respective open ends of the opening means and being tensioned by the pressure of the shank engaging the same.

2. The float according to claim 1 and wherein an upper portion of said body in a plane below the juncture of the neck and body is provided with a passage extending transversely through said upper portion from one side to a diametrically opposite side and thus adapted to permit an end portion of a second leader to be threaded therethrough and fashioned into a leader-attaching and retaining loop.

3. For use in elevating and suspending one's fishhook or hooks well above the bottom of the water which is being fished, fishing tackle comprising, in combination, a fishing line, an elongated buoyant body having an upper end provided with an axially outwardly projecting neck which is reduced in cross-section relative to the cross-section of said body, said neck having an axial screw-threaded socket opening through the upper end of said neck, an elongated head of a cross-section corresponding to the cross-section of said neck and aligned with said neck, said head having a reduced depending screw-threaded shank screwed into said socket, the lower end portion of the head which is situated at the juncture of said shank constituting and providing a shoulder, said shoulder being adapted to clampingly bind itself against the cooperating upper end portion of said neck, said shank being provided adjacent said shoulder with a hole passing through the neck and providing a passage for a spreader, a spreader comprising a resilient leader of elongated form which is provided at an outer end with fishhook means, the inner end of said leader being threaded through said passage, being fashioned into a loop and having a terminal end, an assembling and retaining sleeve carried by said leader and surrounding and retaining said terminal end, the bight portion of said loop being clampingly bound between said shoulder and upper end of the neck with portions of the loop embracing diametrically opposite surfaces of said head, and a clip for positioning and shiftably mounting said float on said fishing line, said clip being disposed at right angles to and having an inner end thereof mounted atop said head, said clip comprising a single length of wire bent upon itself between its ends and forming a narrow elongated eye, one end of said length of wire being free and projecting outwardly and beyond the adjacent outer end of the eye and providing a line piloting finger cooperating with the eye in a manner which facilitates guiding and locating the line within the confines of said eye and subsequently facilitates removing the line from said eye, said finger being resilient and being located in close proximity to an adjacent lengthwise side portion of the eye to provide line-gripping and retaining means.

References Cited in the file of this patent

UNITED STATES PATENTS

| | | |
|---|---|---|
| 1,352,979 | Lawrence | Sept. 14, 1920 |
| 1,778,119 | Neville | Oct. 14, 1930 |
| 2,539,234 | Dobkowski | Jan. 23, 1951 |
| 2,729,014 | Johnson | Jan. 3, 1956 |
| 2,780,023 | Mercier | Feb. 5, 1957 |
| 2,908,989 | Povinelli et al. | Oct. 20, 1959 |
| 2,975,541 | Birrell | Mar. 21, 1961 |

FOREIGN PATENTS

| | | |
|---|---|---|
| 934,093 | France | Jan. 7, 1948 |
| 8,581 | Great Britain | May 19, 1891 |
| 23,775 | Great Britain | Dec. 24, 1892 |
| 62,212 | Norway | Mar. 18, 1940 |